June 11, 1946.   L. E. PRATT   2,401,794
MECHANICAL HAMMER
Filed Oct. 21, 1943
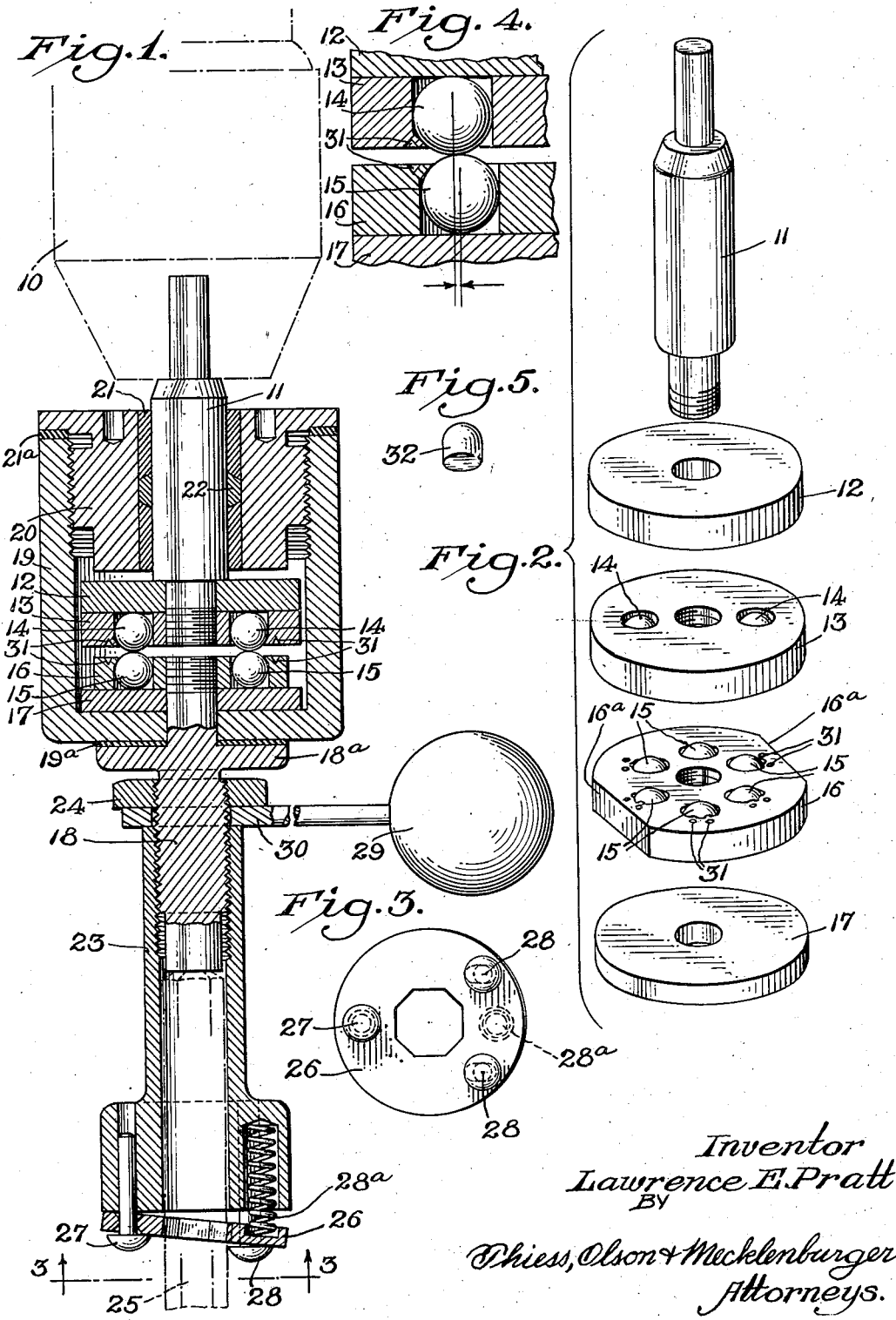
Inventor
Lawrence E. Pratt
By
Thiess, Olson & Mecklenburger
Attorneys.

Patented June 11, 1946

2,401,794

UNITED STATES PATENT OFFICE 2,401,794

MECHANICAL HAMMER

Lawrence E. Pratt, Chicago, Ill.

Application October 21, 1943, Serial No. 507,112

2 Claims. (Cl. 255—43)

My invention relates to what may be termed a mechanical hammer in the sense that it takes the place of a hammer in the hand to deliver hammer blows on a tool such as a Starr drill, for instance, which is being held in the other hand. This has been accomplished in part by taking any conveniently driven rotary motion, such as an electric drill or flexible shaft having a thrust bearing of its own, and converting it into a reciprocating motion. While the invention is shown and described as operating a Starr drill by means of an electric drill, it is possible, with proper chucks and attachments, to use it in many places where pneumatic tools are now used, such as chiseling, riveting, hammering, etc.

It is an object of my invention to provide a tool of the class described which shall be capable of being slipped into the chuck of an electric drill, for instance, and used therewith with substantially the same facility as any tool, which shall be simple, easy and economical of manufacture, rugged, and of few parts, which carries the Starr drill or other tool by a special chuck, and which converts the rotary motion of the electric drill into a reciprocating motion of the Starr drill or its chuck.

Further objects and advantages will appear from the detailed description and claims to follow, in connection with the accompanying drawing which illustrates an embodiment of my invention, and in which—

Figure 1 is a longitudinal central section through the device, parts being shown in full;

Fig. 2 is an exploded view of the motion converting means, the elements being shown in perspective;

Fig. 3 is an end elevational view of the chuck end of the device;

Fig. 4 is a section through the meeting paths of the cam balls, showing the slightly different radial distances of the balls in the two members from the axial line of the tool, and also showing the center punching of the cages to prevent the balls from falling out; and Fig. 5 is a perspective view of a cylindrical cam member which may be used instead of balls.

Referring to the drawing, the chuck 10 of a portable hand electric drill is indicated in dotted lines in Fig. 1. Such drills are driven by small electric motors, have their own thrust bearings and are hand-manipulated. The motor, of course, rapidly rotates the chuck 10.

The mechanical hammer comprises the driving shaft 11, seen also in perspective in Fig. 2, the upper end of which is reduced in diameter and fits securely within the chuck 10 of the electric drill.

On the opposite end of this driving shaft 11 is fitted a backing disc 12 and a cage disc 13, the latter being threaded on the reduced end of shaft 11 and clamping the backing disc 12 against the shoulder on shaft 11. Thus the shaft 11 and the two discs 12 and 13 are all rigidly secured and rotate together. The backing plate or disc 12, as also the cage 13, should lie accurately in planes at right angles or perpendicular to the axis of shaft 11.

The cage disc 13, so called, accommodates, in suitable apertures therethrough, two balls 14. These balls are slightly greater in diameter than the thickness of the cage disc 13, the projecting portions constituting cam surfaces adapted in their rotation to strike and cam over corresponding balls in the opposing member. For this reason there are preferably two such balls 14 diametrically opposite and equally distant from the axis in the driven member, so that a balanced operation may be had.

This driving cage disc member 13 faces a similarly constructed nonrotatable driven member consisting of protruding balls 15, six in number, diametrically opposite in pairs, in perforations in the cage disc 16, which is not quite as thick as the diameter of the balls, and which is backed by the plain backing disc 17. This disc 17 in the driven member and the disc 12 in the driving member receive the longitudinal thrusts of the balls 14 and 15 as they strike each other in the revolution of the driving member. These two cage discs 13 and 16 should be the same thickness to get the full throw of the driven member. If one is less, the stroke is reduced to that extent.

These discs 16 and 17 are mounted on the threaded end of hammer member 18, on the inside of the housing member 19, the end of the latter lying against a leather or similar gasket 19a on the flange 18a on member 18, and the cage disc 16, with its flat sides 16a for the reception of a suitable tool or wrench, threading on the end of member 18, clamps all these relatively stationary parts, 16, 17, 18 and 19, together. The cage 16 and back plate 17 should be perpendicular to the axis or center line of the shaft 18 and this should be in alignment with the axis of shaft 11.

The stationary housing 19 extends in tubular or cup-shaped form toward the rear over the driven discs and quite close to but not touching the driving discs. At its open end it receives the threaded bearing plug 20, having a flange at its outer end which bindingly engages against the gasket 21a of leather or other suitable material on the edge of housing 19. Spanner wrench sockets in the top of plug 20 enable the same to be turned by a suitable wrench.

This bearing plug 20 has a bushing 21 in two end parts forming a bearing for the rotatable shaft 11 and having a convenient oil seal 22. By pushing the ends of bushings 21 closer together the oil seal becomes adjusted to the shaft 11. This bushing 21 is preferably formed of self-lubricating material. In practice, a small amount of light lubricating oil is preferably sealed within the housing 19, the gaskets 19a and 21a and the oil seal 22 preventing any escape thereof or the entrance of any dirt.

The threaded shank of the hammer member 18 receives the tool chuck 23 which is finally secured in position on the stem by the lock nut 24 tightened against it either directly, if no auxiliary handle is used, or through the same, if used.

In the present instance the chuck 23 is a Starr drill chuck, having a central bore. The Starr drill 25, which is octagonal in cross-section, when inserted in the chuck 23 abuts the end of the hammer-shank 18. The drill 25 is indicated in broken lines in Fig. 1.

A locking plate or jaw 26 at the end of the chuck grips the drill by friction by tilting slightly. The drill can be easily and quickly removed or inserted by pressing the jaw or plate 26 against the end of the chuck and sliding the drill 25 into or out of place. The aperture in the jaw 26 is octagonal to fit the drill. Since there are different sizes of such Starr drills, different chucks 23 should also be provided and in the sale of the device several chucks of different sizes go with the device.

The hinge point of this plate 26 is on pin 27 which is secured in the chuck. The aperture for the pin 27 in the lock plate is suitably reamed or bevelled out on both sides of the plate, as indicated in Fig. 1, to permit the plate freely to hinge back and forth. At the opposite edge of the disc or plate 26, two spaced pins 28 pass through slots, shown dotted in Fig. 3, in the disc 26 and are secured in the chuck end. A coil spring 28a is located in a hole or bore in the chuck between the pins 28 and bears outwardly on the inside of the disc 26, as shown.

In the position shown, the edges of the aperture through which the drill passes grip and tend to bite into the drill and so lock and prevent it from coming out of the chuck. At the same time it is quickly freed from the disc by pressing the disc against the chuck.

The stationary or nonrotatable part of the device, to wit, the driven member, is normally and preferably held in one hand when the device is in use, and is thus prevented from turning; but some might prefer the optional handle 29 in the form of a ball connected by a strip or rod of metal with a loop 30 passing around shank 18 and clamped in position between the lock nut 24 and the end of chuck 23.

In operation, it is usual to hold the electric drill 10 in one hand and the housing 19 in the other. There is a sufficient clearance between the inner end of the plug bearing 20 and the adjacent backing plate 12 to permit the driving and driven ball members to be entirely separated and out of contact. But by placing the Starr drill against the work and pressing the electric drill toward it, thus utilizing the thrust bearing of the electric drill, this clearance and slack is taken up and the stationary set of balls are brought into the path of the rotating balls, with the result that the balls act as cams, and since the driven end is held from rotation it vibrates or reciprocates longitudinally as the rotating pair of balls 14 strike the nonrotating pairs of balls 15. This has the effect of rapidly hammering on the drill to cause it to do its work. Such drills are used in stone, plaster, and the like, and are supposed to be turned 90° or so intermittently. That is accomplished here by turning the housing back and forth while held in the hand. If desired, the housing 19 may be alternately released and gripped in the hand, thus permitting the housing to turn intermittently and the Starr drill properly to do its work.

While the balls 14 and 15 may be the same distance from the axial line of the driving and driven members, for a freer action one radius may be a few thousandths of an inch greater than the other. Thus, as indicated by the arrows in Fig. 4, the radius of one may be slightly shorter than that of the other, so that the balls will contact each other off center and will revolve in their cages, thus permitting a freer passing of the balls over each other.

This arrangement also tends to keep the parts centered and the driving and driven members in axial alignment in operation, keeps the bearing 21 from wearing out of line and prevents any tendency of the end of shaft 11 to whip, and if wearing does take place the balls still strike squarely.

As before stated, the number of balls in the driving and driven members may be varied, though I prefer the arrangement shown. The number of the balls in the driven member depends largely upon the size of the balls and the inside diameter of the housing and the number of reciprocations per minute of the tool that is deemed best adapted to the work. It is simple to change from one to another by removing the bearing plug 20 and the driving assembly as a unit; then unscrewing the case 16 by the special wrench engaging the flattened sides 16a and removing same and its balls; then replace the cage and balls by another disc and balls of a different number of pairs and reset plug 20. Other changes and substitutions of balls may be made in this simple way.

The ball cage openings in both cages 13 and 16 may be upset on the face surfaces by any convenient method, such as center punching 31, out of the path of travel of the balls, to provide a means of holding the balls in their cages. This, of course, should be done before the discs are hardened.

All parts should be made of proper material and hardened, if need be, for proper operation of the unit. By having the backing discs 12 and 17 and the cages 13 and 16 harder than the balls, most of the wear will be on the balls, which readily may be replaced with commercial bearing balls of proper size.

Fig. 5 shows short cylinders or rollers 32 with rounded ends which may be used instead of the balls in the cages 13 and 16. The rounded ends, of course, would protrude and form the cams to convert the rotary driving motion into the reciprocating driven motion. Opposing stationary cams in place of the balls or rollers could be used, or balls or cylinders could be used in one member while a fixed cam or cams were used in the other. The ball method throughout, however, is preferred.

The design and mode of operation of this unit are such that the threaded parts will automatically stay firmly attached to their respective parts.

It is apparent from the foregoing that I have produced an extremely simple and effective device for the purposes intended, that it is comparatively inexpensive to manufacture and maintain and is of long life, that it is readily disassembled for inspection, care and repair, and that the parts most likely to wear and need replacement are standard, commercial, readily procurable parts, such as balls used for ball bearings.

Utilizing the thrust bearing of the electric drill dispenses with the necessity of one in this device. The device is close-coupled. The backing plates and cages are all in planes parallel to each other and at right angles to the center line of the driving and driven members, which gives accurate action. The whole unit is compact, small, light in weight and easy to handle. It can be handled like the drill; that is, an electric drill with this device in its chuck is handled substantially the same as the drill without it. It is easily carried in the operator's kit of tools, and increases the usefulness of the electric drill. Its labor-saving feature and ease of operation over the old hand hammer and Starr drill method are apparent.

The chuck is simple, easy to operate, provides quick change in case of sharpening drill or for other purposes.

Having thus described my invention and the best manner known to me of carrying same into effect, and appreciating that various changes and alterations may be made therein without departing from the spirit of the invention or the intended scope of the claims to follow, what I claim and desire to secure by Letters Patent is:

1. A device of the class described adapted to be received and connected as a tool in the chuck of a hand-manipulated, electric or power drill stock, comprising a cylindrical housing, opposed discs therein, interengaging camming balls locked in the opposed faces of said discs, one of said discs being rigidly secured in one end of the housing, a tool chuck secured to the outside of that end of the housing and adapted to receive a percussion drill therein, a driving shaft connected with the other disc, a bearing therefor in the opposite end of the housing, said shaft being rotatable and reciprocable in said bearing and adapted to be received at its outer end in the chuck of the hand-manipulated drill stock, whereby when the drill is pressed against the work the discs approach each other and the balls are brought into camming engagement and deliver hammer-like blows on the drill and when the pressure is relieved on the drill the balls force the discs apart with the balls out of striking engagement with each other.

2. A power mechanism for converting rotary motion into reciprocatory motion comprising in combination a member rotatable by a source of rotary motion and a second member adapted for reciprocatory motion, a framework for supporting both said members, said first member including at least one pair of spheroidal cam elements, the elements of the pair being diametrically opposed with respect to the axis of rotation and equidistant therefrom, said second member including at least one pair of spheroidal cam elements, the elements of that pair being diametrically opposed with respect to said axis and equidistant therefrom, the elements of both pairs being in opposed relation and adapted upon rotation of said first member for camming relation therebetween, and the radial distance of the center of the spheres forming one pair of elements from said axis being greater than the radial distance of the opposed pair whereby the successive points of contact of the elements during rotation lie on a circle whose radius is intermediate said other two radii.

LAWRENCE E. PRATT.